Jan. 24, 1933.  W. H. ALLISON  1,895,362
APPARATUS FOR THE MANUFACTURING OF PLATE GLASS
BLANKS AND THE ARTICLE PRODUCED THEREBY
Filed July 7, 1931
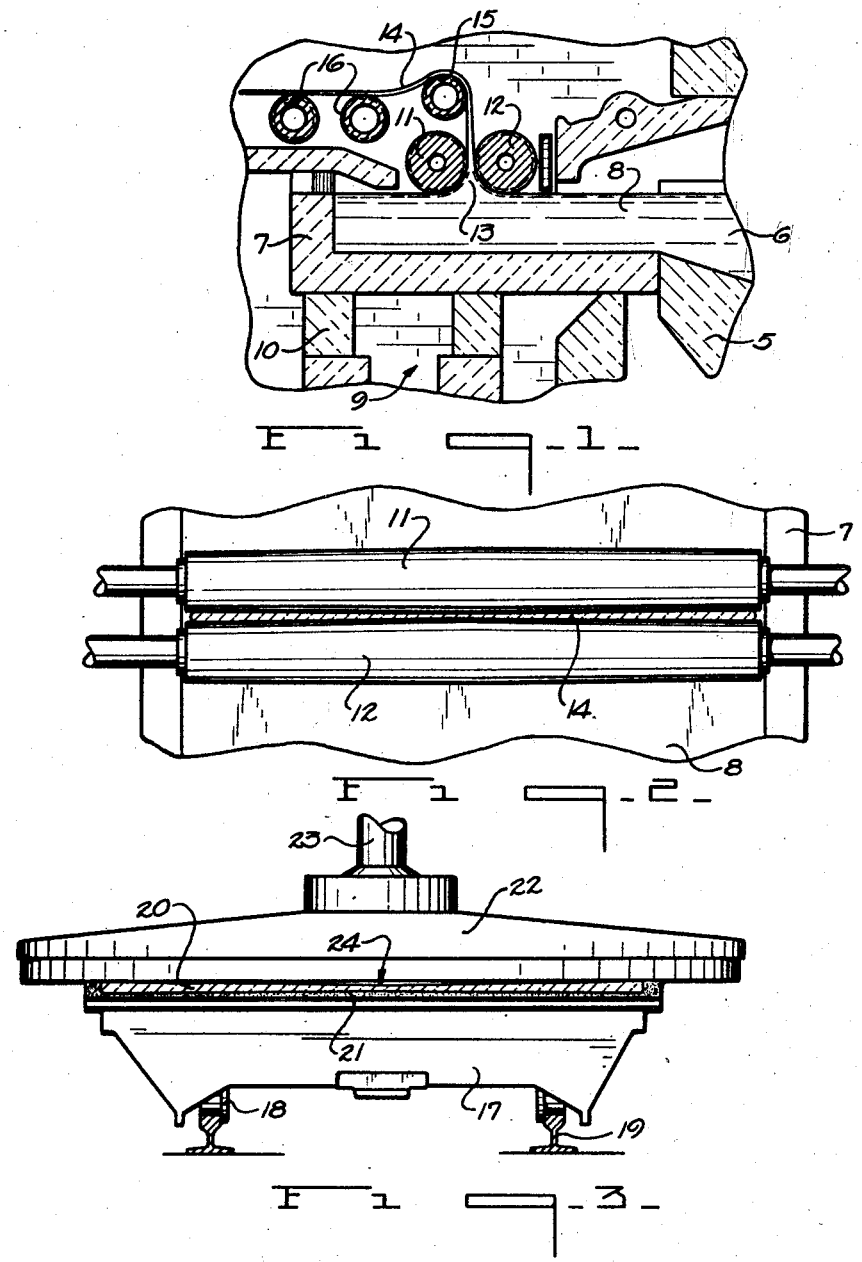
INVENTOR
William H. Allison
BY
Frank Fraser
ATTORNEY Patented Jan. 24, 1933

1,895,362

UNITED STATES PATENT OFFICE

WILLIAM H. ALLISON, OF CHARLESTON, WEST VIRGINIA, ASSIGNOR TO LIBBEY-OWENS-FORD GLASS COMPANY, OF TOLEDO, OHIO, A CORPORATION OF OHIO

APPARATUS FOR THE MANUFACTURING OF PLATE GLASS BLANKS AND THE ARTICLE PRODUCED THEREBY

Application filed July 7, 1931. Serial No. 549,234.

The present invention relates to an improved apparatus for the manufacture of plate glass blanks and to the article produced thereby.

In the production of plate glass according to one process, a plurality of sheets of glass to be surfaced are mounted upon a series or train of cars or tables and passed in a definite substantially horizontal path first beneath a series of grinding runners and then beneath a series of polishing runners to surface one side of the sheets, after which the said sheets are turned over upon the tables and again passed beneath the same or a second series of grinding and polishing runners to surface the second side.

The sheets of glass which are to be ground and polished are usually termed "plate glass blanks", and heretofore these blanks have been formed so that the opposite surfaces thereof were relatively flat and substantially parallel with one another prior to the grinding and polishing thereof. The object of this invention is the production of a novel type of plate glass blank shaped in such a manner as to facilitate the grinding operation and reduce the liability of breakage of the glass such as might be occasioned by a rocking movement of the grinding runners.

Generally speaking, the desired result is secured by forming a plate glass blank which is relatively thinner at its center than at the sides thereof. That is to say, at the beginning of the grinding operation, the surfaces of the blank are relatively concave, with the degree of concavity increasing from the opposite sides of the sheet to the center thereof. This blank is then adapted to be ground and polished upon both sides thereof in the usual fashion to remove the concave condition from its opposite surfaces and thereby render the said surfaces plane and parallel with one another.

Other objects and advantages of the invention will become more apparent during the course of the following description when taken in connection with the accompanying drawing.

In the drawing forming a part of this application and wherein like numerals are employed to designate like parts throughout the same, Fig. 1 is a vertical longitudinal section through one form of apparatus which may be employed to carry out the present invention, Fig. 2 is a plan view of the sheet forming rolls, Fig. 3 is a representation of one form of grinding apparatus, and Fig. 4 is a sectional view of a finished ground and polished sheet.

In the drawing, the numeral 5 designates a tank furnace adapted to contain a mass of molten glass 6. Connected to the tank furnace 5 is a receptacle 7 which is adapted to be constantly supplied with a pool of molten glass 8 from the mass contained in said furnace. Preferably, the receptacle 7 is in the form of a pot and is adapted to contain a relatively more shallow bath of molten glass than that contained in the tank furnace proper to facilitate a more accurate control of the molten glass. To assist in controlling the temperature of the molten bath 8, the pot or receptacle 7 is preferably surrounded by a heating compartment 9 in which are arranged stools 10 for supporting the said receptacle.

Positioned above the bath of molten glass 8 and in relatively close proximity to the surface thereof are the two forming rolls 11 and 12 preferably, although not necessarily, disposed side by side in substantial horizontal alignment with one another as shown. These rolls are also preferably positively driven in such a manner that after a sheet has been started by the use of a bait or other means as is well understood in the art, a relatively thick heavy body of glass 13 will be drawn or moved vertically from the pot 7 between the said rolls and reduced thereby to sheet form as indicated at 14. The rolls 11 and 12 are adjustably mounted relative to one another to permit the production of the desired thickness of sheet which is controlled by the width of the sheet forming pass created therebetween. The sheet, after passing between the rolls 11 and 12, is continued upwardly for a relatively short distance and then deflected into the horizontal plane about a bending roll 15 and carried along upon a plurality of conveying rolls 16 into and through an annealing leer.

The type of rolling machine generally described hereinabove is particularly well adapted for the production of plate glass blanks which are to be subsequently ground and polished. Heretofore, the forming rolls 11 and 12 have ordinarily been of true cylindrical form having a uniform diameter throughout the entire length of the body portions thereof which engaged the glass so that the sheet produced thereby was of a relatively uniform thickness, with the opposite surfaces thereof substantially flat and parallel. However, according to the present invention, the forming rolls 11 and 12 are of such a construction that the sheet 14 formed thereby is relatively thinner at its center than at the opposite sides thereof as clearly shown in Fig. 2. In other words, the said forming rolls taper from their centers toward their opposite ends so that the opposite surfaces of the glass sheet are relatively concave, with the concavity or recess in each face increasing in depth from the side edges of the sheet to the center thereof.

After the sheet leaves the forming rolls 11 and 12, it is of course still relatively plastic and therefore the bending roll 15 and conveying rolls 16 are preferably of the same construction as the forming rolls so that they will serve to support the sheet in a manner to prevent sagging of the thinner central portion thereof with respect to the thicker side portions until the said sheet has become sufficiently set to support its own weight.

After the continuous sheet 14 has been thoroughly and completely annealed, it is adapted to be cut transversely into individual sheets and these sheets are especially well adapted for use as plate glass blanks. Moreover, this particular type of blank is very desirable for use in the continuous system for surfacing sheet glass. As pointed out above, in this system a plurality of cars or tables carrying the glass sheets to be treated upon the upper surfaces thereof are passed first beneath a series of grinding runners and then beneath a series of polishing runners to surface one side of the sheets, after which the said sheets are turned over upon the tables and again passed beneath the same or a second series of grinding and polishing runners to surface the second side.

In Fig. 3 of the drawing, the numeral 17 designates one of the tables of the continuous system which is here shown as being mounted upon wheels 18 adapted to travel upon the rails 19. The glass sheets 20 constituting the plate glass blanks are adapted to be secured upon the upper surface of the tables by embedding them within a layer of plaster of Paris or the like 21. One of the grinding runners is designated at 22 and is carried at the lower end of a vertically disposed drive spindle 23. These grinding runners are relatively very heavy, being ordinarily in the form of substantially solid discs constructed of cast iron or the like. Moreover, the runners are also usually carried at the lower ends of the vertical drive spindles in such a manner that they are permitted a limited amount of universal rocking and vertical bodily movement with respect thereto. I have found that when using a plate glass blank which is relatively thinner at its center than at the opposite sides thereof or, in other words, when the surface of the sheet to be ground and polished is slightly concave, that the grinding runners seat themselves better upon the glass during the grinding thereof, as a result of which the tendency of the runners to rock upon the sheets is materially lessened and, as a consequence, breakage of the glass from this cause is reduced to a minimum.

After the glass sheets have been secured upon the tables, they are adapted to be passed first beneath a series of the grinding runners 22 and thence beneath a series of polishing runners (not shown) to surface the upper sides thereof. During this grinding and polishing, the recess or depression 24 in the upper face of the sheet will be removed so that when the surfacing thereof has been completed, the said face of the sheet will be flat or plane. The sheets are then turned over upon the tables and again secured thereto, after which the second side is treated in the same manner so as to render the sheet of a uniform thickness throughout. with the opposite surfaces thereof being plane and parallel with one another as illustrated in Fig. 4.

The process disclosed herein for surfacing the glass sheets, or in other words for producing the plate glass, is not being claimed per se in this application since it constitutes the subject-matter of a copending application filed by me on July 7, 1931, Serial No. 549,235.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for forming plate glass blanks, a receptacle containing a mass of molten glass, a pair of rotatable forming rolls positioned above said mass and adapted to draw a relatively heavy body of glass upwardly therefrom and reduce it to sheet form, said rolls tapering from their centers toward their opposite ends to form a sheet which is relatively thinner at its center than at the sides thereof, a roll for deflecting the sheet from the vertical into the horizontal plane, and a plurality of horizontally arranged rolls for supporting and conveying the sheet horizontally, said bending roll and conveying rolls also tapering from their centers toward their opposite ends so as to prevent sagging of the thinner central portion of the sheet relative to the thicker side portions thereof until the said sheet has become sufficiently set to support its own weight.

2. The process of forming plate glass blanks consisting in moving a relatively heavy body of molten glass upwardly from a molten bath, rolling said body of glass to form a sheet which is relatively thinner at its center than at the opposite sides thereof, in deflecting the sheet from the vertical into the horizontal plane, carrying the sheet horizontally, in preventing sagging of the thinner portions of said sheet with respect to the thicker portions thereof until the sheet has become sufficiently set to support its own weight, and then annealing the sheet.

Signed at Charleston, in the county of Kanawha and State of West Virginia, this 3rd day of July, 1931.

WILLIAM H. ALLISON.